April 15, 1969  M. THORNEYCROFT  3,438,293
PROFILING LATHES

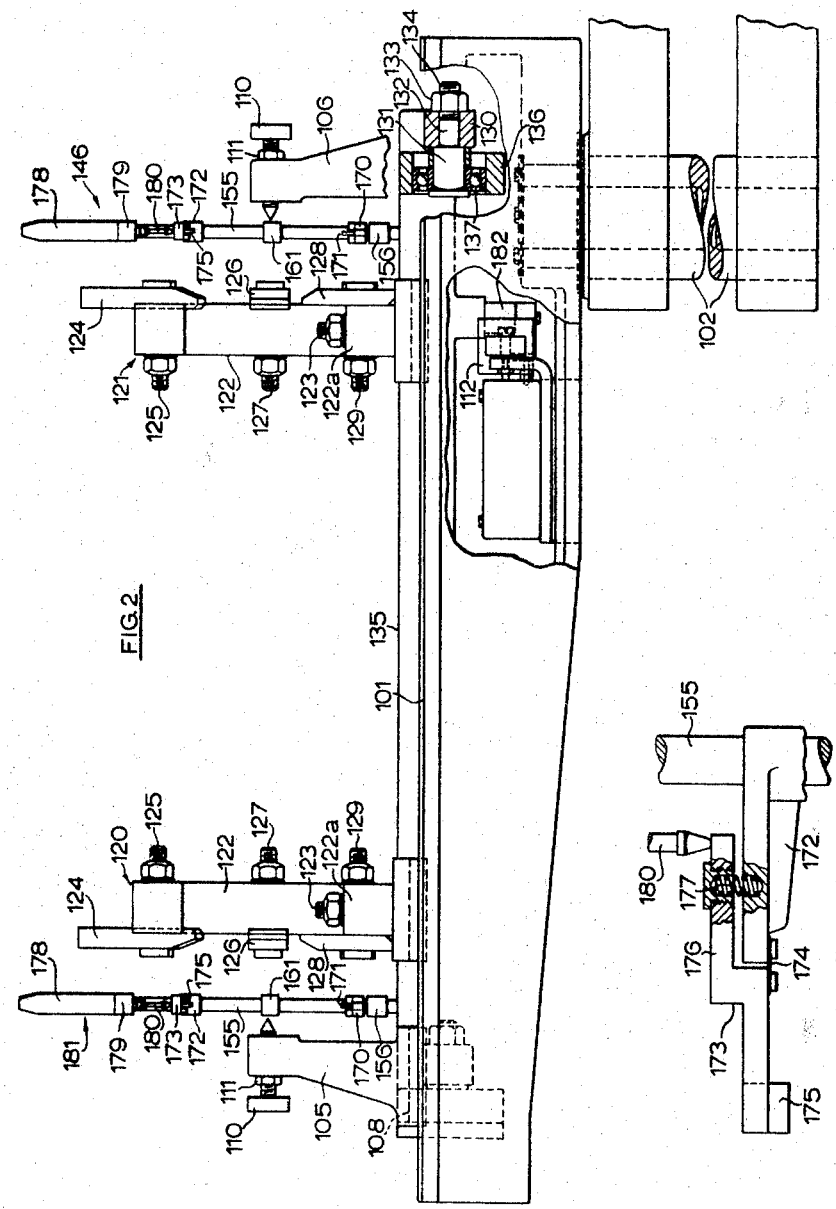

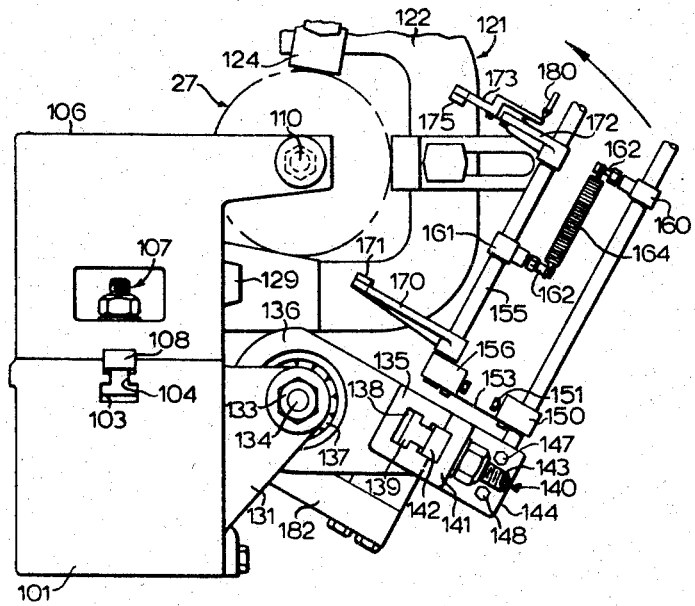

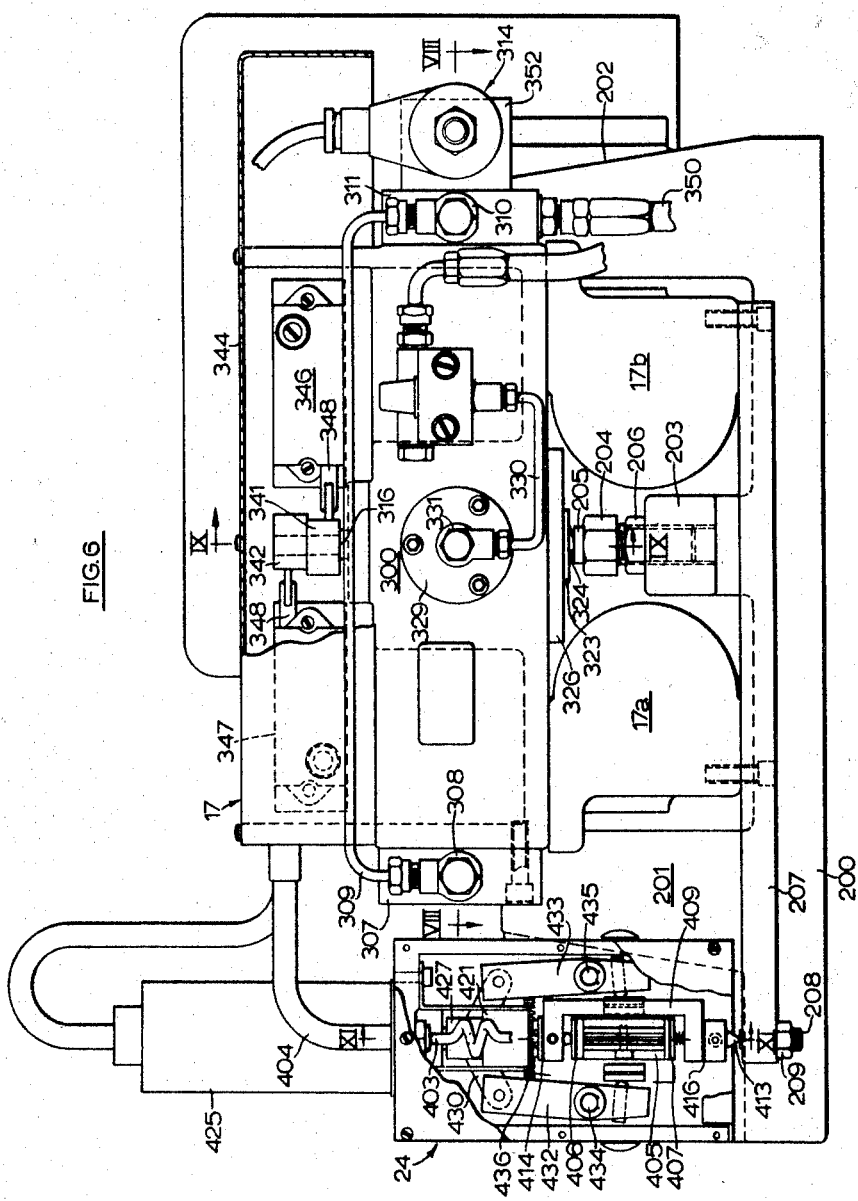

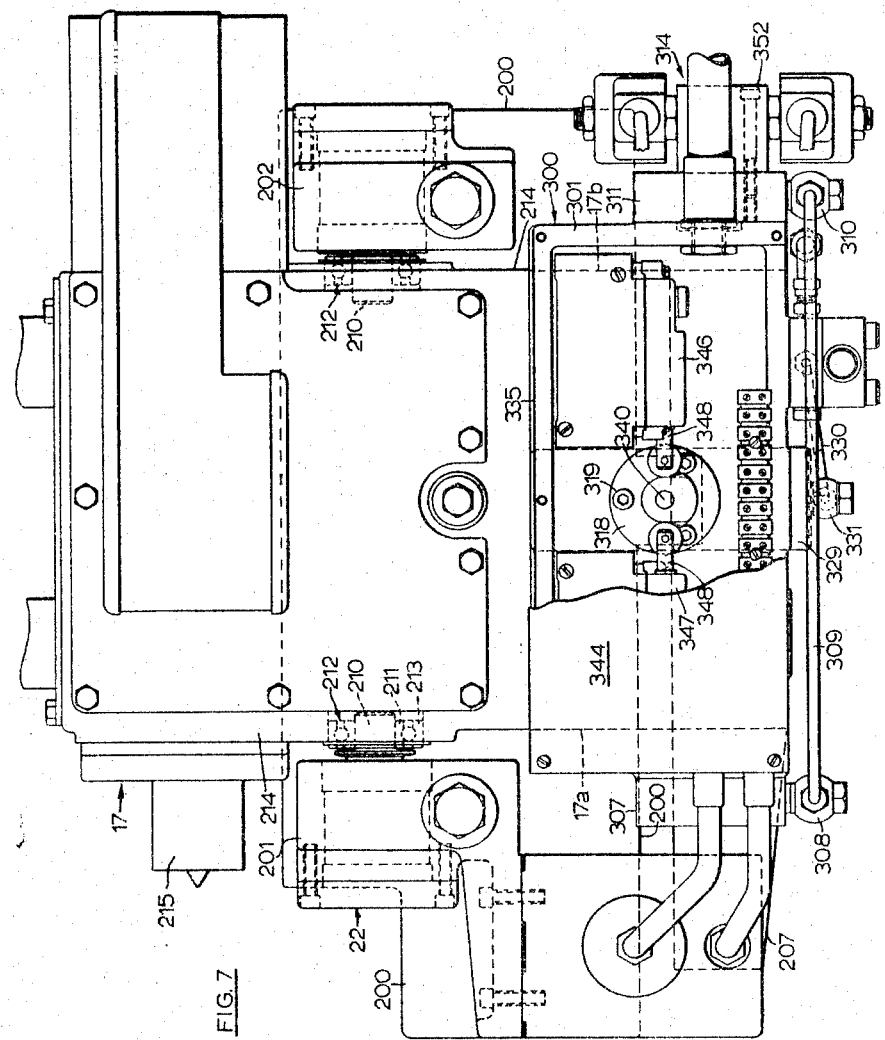

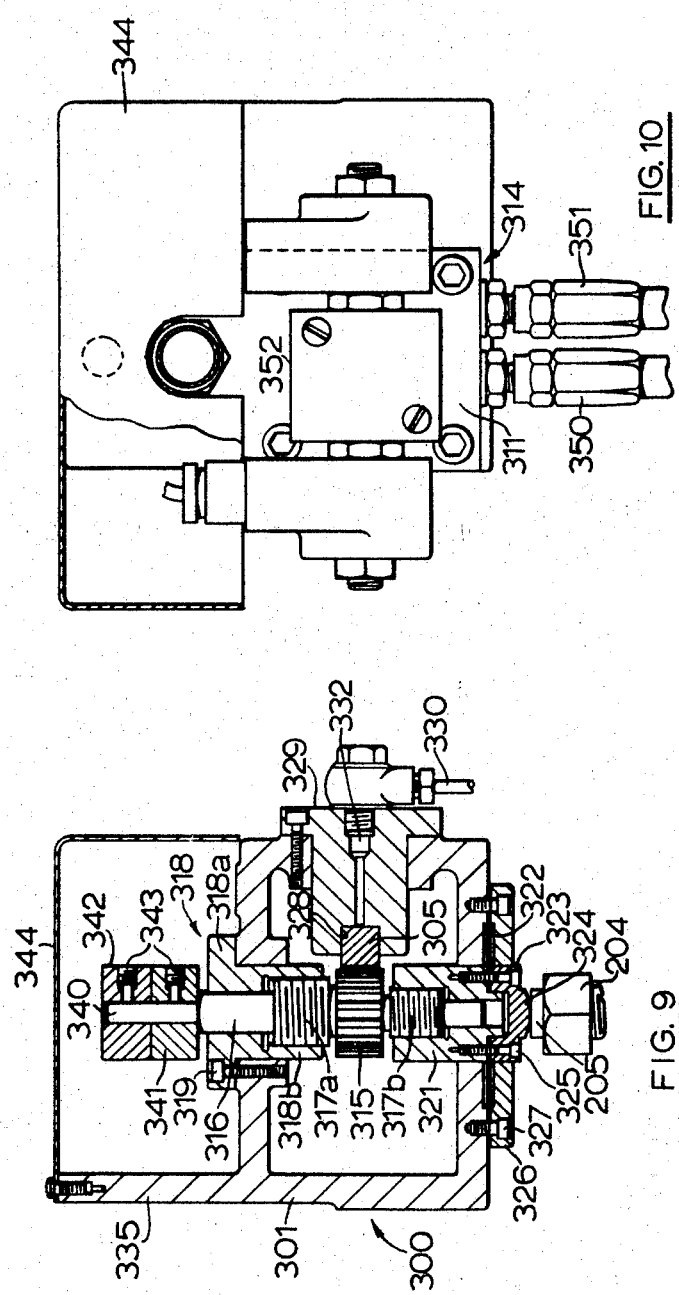

Filed Dec. 13, 1966  Sheet 8 of 10

Inventor
Malcolm Thorneycroft
By Watson, Cole, Grindle & Watson
Attorneys

United States Patent Office 3,438,293
Patented Apr. 15, 1969

3,438,293
PROFILING LATHES
Malcolm Thorneycroft, Daventry, England, assignor to Charles Churchill and Company Limited, Northampton, England, a British company
Filed Dec. 13, 1966, Ser. No. 601,424
Claims priority, application Great Britain, Dec. 14, 1965, 53,077/65
Int. Cl. B23b 3/28; B24b 5/16
U.S. Cl. 82—14        23 Claims

ABSTRACT OF THE DISCLOSURE

The specification describes a post-operative error correction device for an automatic profiling lathe of the kind in which excursions of a tool in relation to the workpiece are controlled by a servo-mechanism operated in response to excursions of a tracer over a template, the device serving to raise or lower each end of the template to compensate for dimensional inaccuracies measured on a finished workpiece.

---

The present invention relates to profiling lathes and is particularly concerned with an automatic profiling lathe of the kind in which excursions of a tool in relation to the workpiece are controlled by a servo-mechanism operated in response to excursions of a tracer over a template.

Profiling lathes of the kind specified are commonly employed at the present time, and their use enables workpieces having complex profiles to be produced at high production rates. In general, a high degree of accuracy of machining can be obtained using, for example, a hydraulic servo-mechanism mounted on the profiling carriage and operating on the tool slide to vary the amount of feed to the tool as the profiling carriage traverses the length of the workpiece, the servo-mechanism being controlled by a tracer member which moves with the carriage and follows the profile of the template and in response to a change in profile operates on a pilot valve of the servo-mechanism.

It has, however, been found that although the servo-mechanism can be made to move the tool accurately in accordance with the movement of the tracer, wear in the tool itself gives rise to an inaccuracy resulting in a finished product which is oversize and it then becomes necessary to follow the automatic machining operation with one or more subsequent machining operations which are time absorbing, when attempts are being made to achieve high production rates. Temperature variations in the component parts of the machine also give rise to dimensional errors in the machined workpiece, calling for subsequent machining operations or rejection of the workpiece.

It is one object of the present invention to provide for use with a profiling lathe, means whereby the above-mentioned errors can be compensated for readily.

According to the present invention there is provided an error correction device for a profiling lathe of the kind specified, the device comprising a gauging unit mounted on or near to the lathe for gauging a workpiece and for generating an error signal representing the difference between the gauged dimension of the workpiece and the required dimension, a template displacement measuring device for generating a template displacement signal representing the displacement of the template from a preset datum position, a difference unit for generating a difference signal representative of the difference between the error signal and the template displacement signal and correcting means responsive to said difference signal for so moving the template as to reduce said difference signal.

Figure 1:
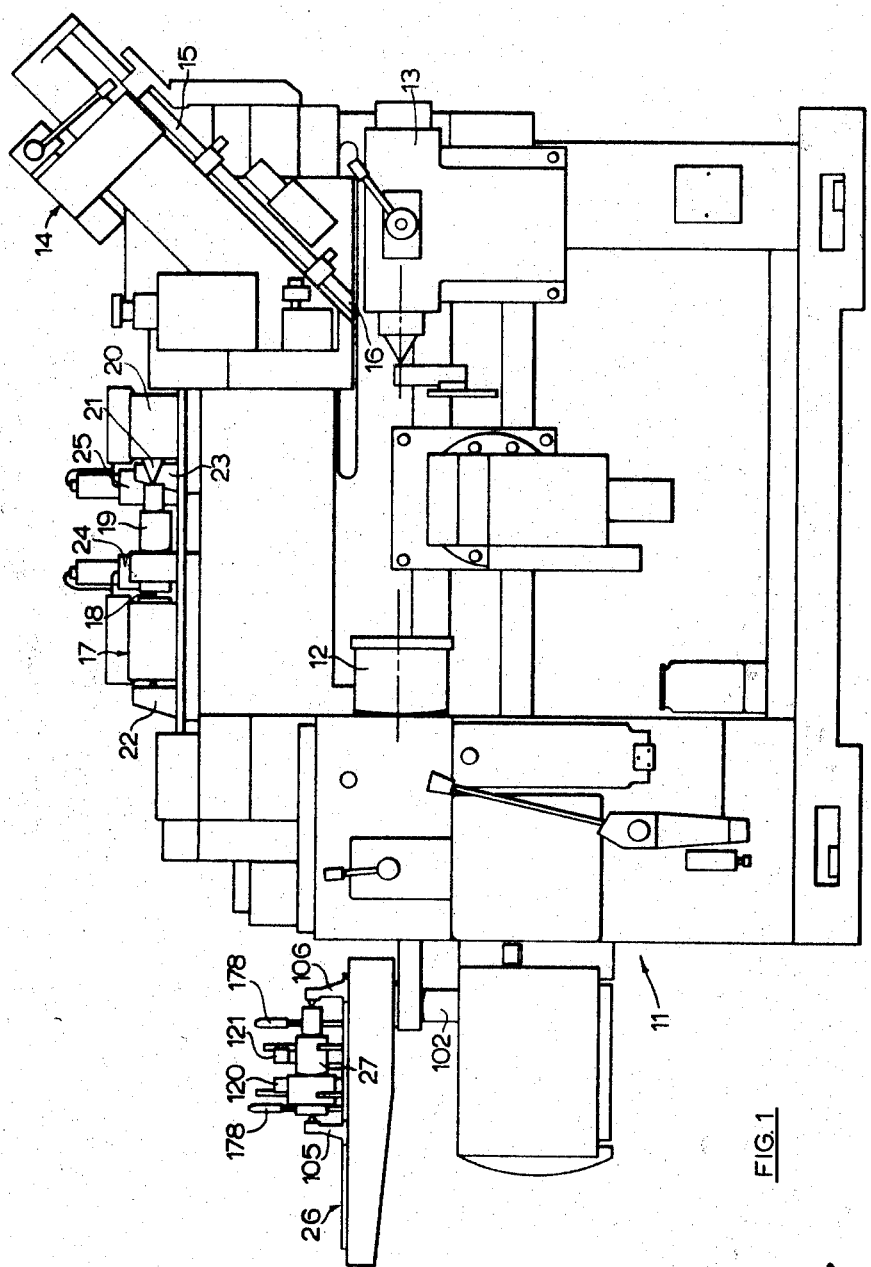
Figure 8:
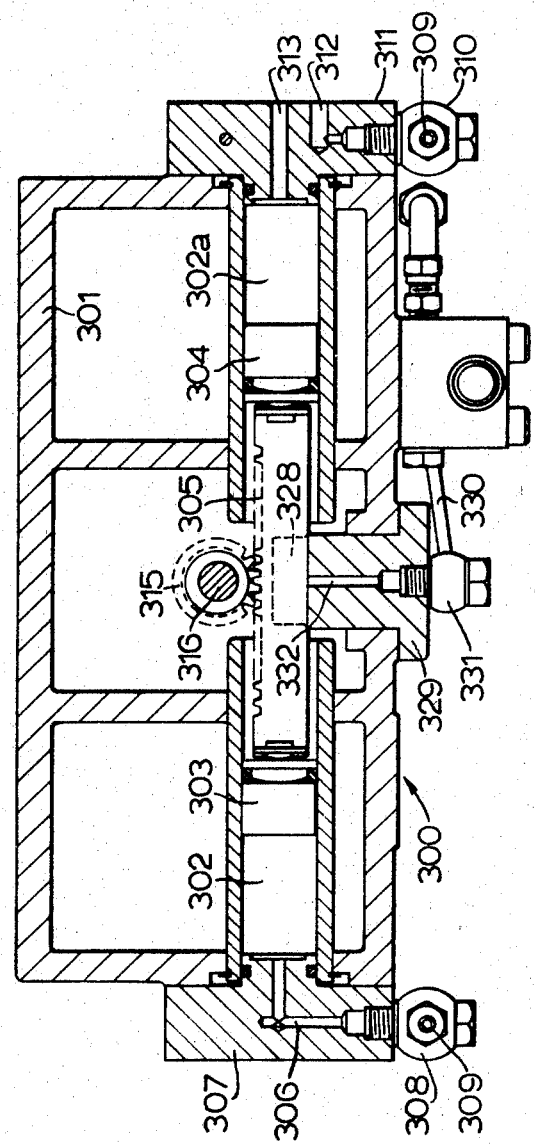
Figure 11:
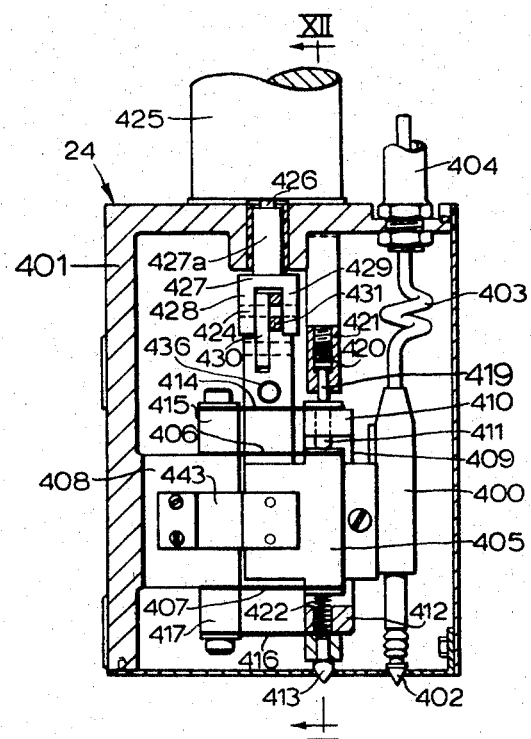
Figure 12:
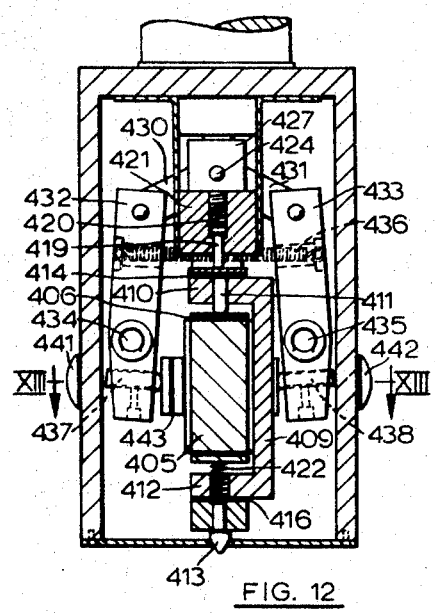
Figure 13:
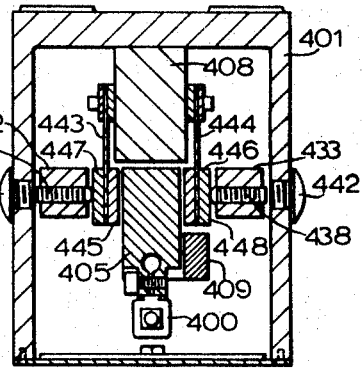
Figure 14:
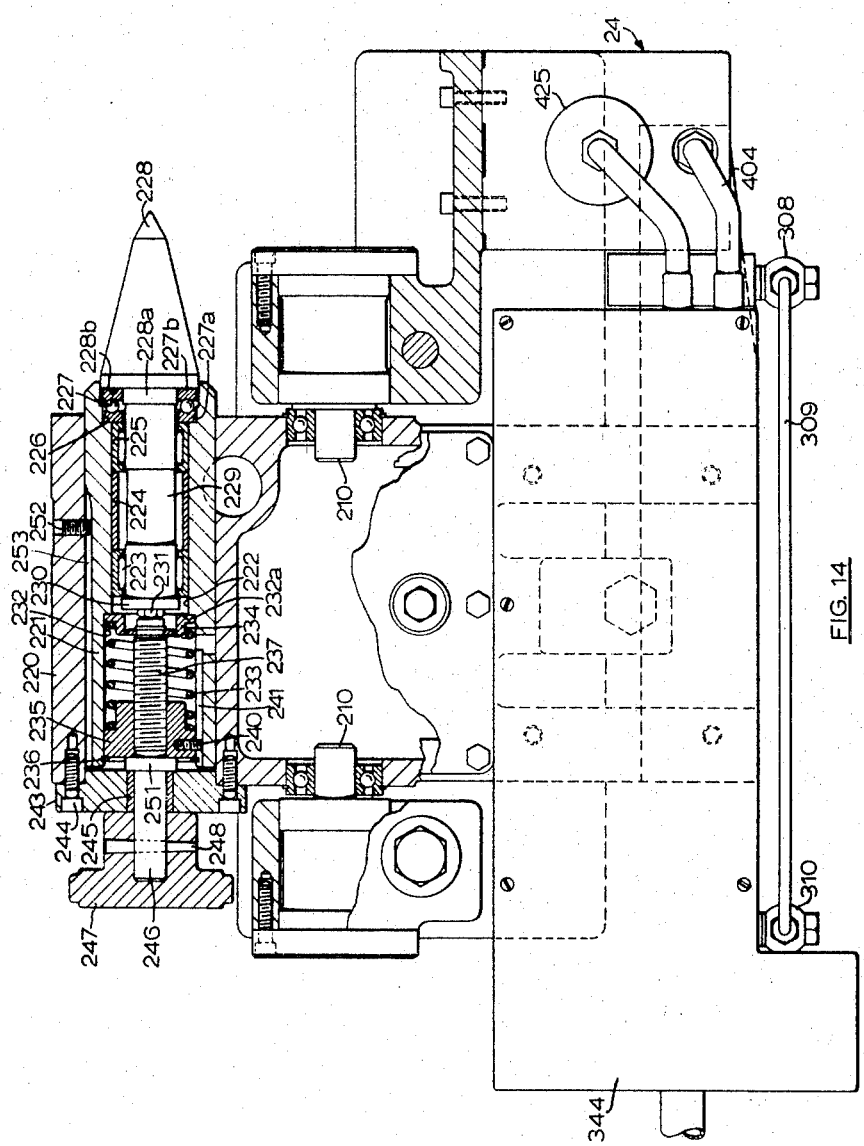
Figure 15:
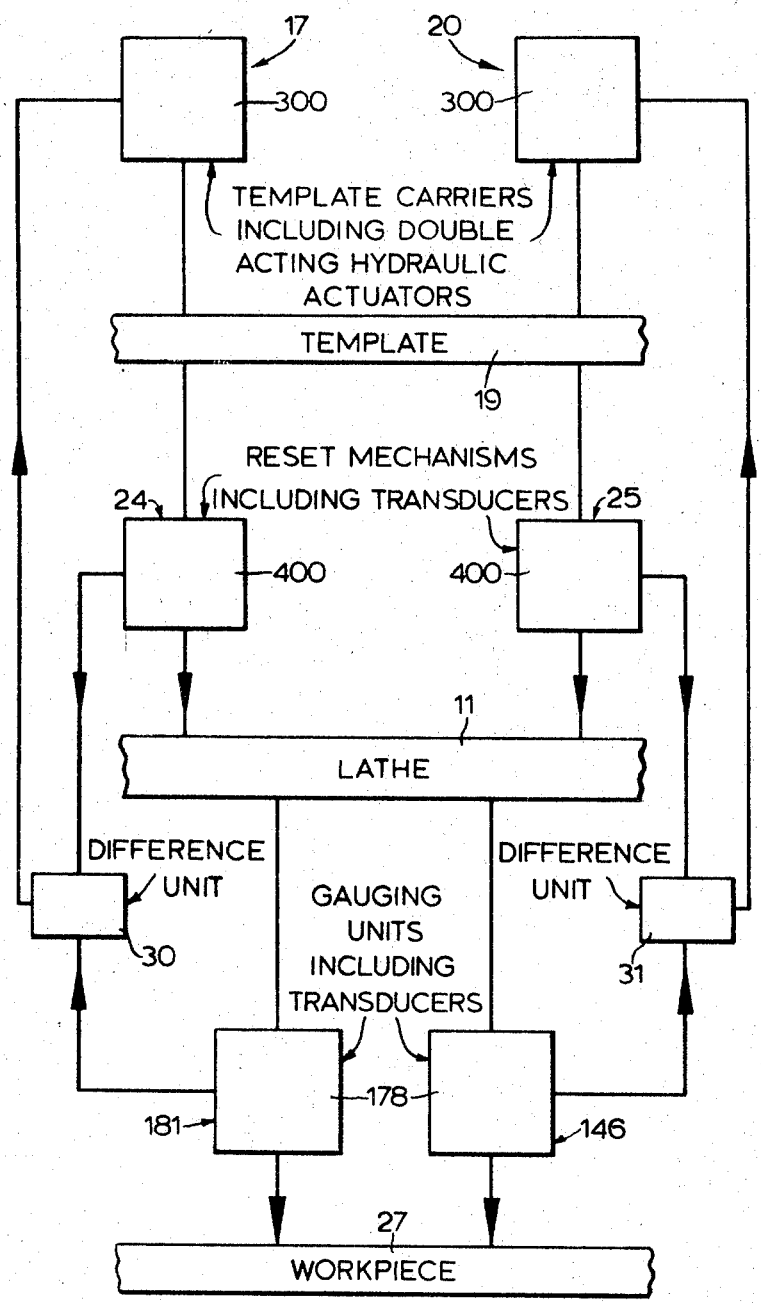

A preferred embodiment of the invention will now be described, by way of example only, with reference to the accompanying drawings in which:

FIG. 1 shows diagrammatically in elevation an automatic profiling lathe to which the device is applied,
FIG. 2 shows a gauging station of the device in elevation and partial section,
FIG. 3 is an end elevation of the gauging station of FIG. 2, in part section,
FIG. 4 is an another end elevation of the gauging station showing a gauging unit pivoted to another position,
FIG. 5 is a detail of the gauging unit,
FIG. 6 is a rear elevation, partly broken away to show a reset mechanism and two limit switches and cooperating cams of the left-hand template support shown in FIG. 1,
FIG. 7 is a plan view of the support of FIG. 6, partly broken away to show the limit switches and cams,
FIG. 8 is a horizontal section along the lines VIII—VIII of FIG. 6, showing an actuator mechanism,
FIG. 9 is a vertical section of the actuator mechanism along the lines IX—IX of FIG. 6,
FIG. 10 is an end elevation of a changeover valve,
FIG. 11 is a section along the lines XI—XI of FIG. 6 showing the reset mechanism in greater detail,
FIG. 12 is a section through the reset mechanism along the lines XII—XII of FIG. 11,
FIG. 13 is a section through the reset mechanism along the lines XIII—XIII of FIG. 12,
FIG. 14 is a plan partly in section of the right-hand carrier shown in FIG. 1, and
FIG. 15 is a block diagram showing schematically the operation of the error correction device according to the invention.

In the preferred embodiment of the invention the error correction device is used in conjunction with an automatic profiling lathe 11 which is shown diagrammatically in elevation in FIGURE 1. The lathe 11 which is of known type includes a head stock 12 and a tail stock 13 between which a workpiece (not shown) is supported for rotation about a horizontal longitudinal axis. A profiling carriage 14 which is arranged for horizontal traversing movement along the length of the workpiece supports a profiling slide 15 carrying a tool 16 adapted to be fed towards or away from the workpiece. A left-hand template carrier 17 carries a tail-stock 18 for supporting the template 19 defining the profile for the workpiece and a right-hand template carrier 20 supports the other end of the template 19 by means of the centre 21. The template carrier 17 is mounted in a template carrier support 22 and the template carrier 20 is mounted in a template carrier support 23. The supports 22 and 23 may be moved along the frame of the lathe in conventional manner to accommodate templates of different lengths. The template carriers 17 and 20 are each mounted in their respective template carrier supports 22 and 23 for rotation through a very small arc to cause each end of the template to be adjustably raised or lowered independently of the other in relation to the frame of the lathe 11 in a manner hereinafter to be described. A reset mechanism 24 is associated with the carrier 17 and a similar mechanism 25 with the carrier 20. A gauging station 26 is shown mounted independently of the lathe 11 and carrying a workpiece 27.

The gauging station 26 will now be described in detail with reference to FIGURES 2 to 5 of the accompanying drawings. The gauging station 26 comprises a table 101 which is mounted near its right-hand end for rotation in a horizontal plane on the head of a pedestal 102. The table 101 is of generally square channel section having an open rear. In the top face of the table 101 is a guide slot 103 of inverted T section, the shoulders of the top surface of the guide 103 being recessed at a recess 104. Two stocks 105 and 106 are positioned above the table 101 and are arranged to be clamped at any desired position along the table by clamping assemblies 107, the alignment of the stocks 105 and 106 being assured by bars 108 the lower parts of which cooperate with the recess 104 and the upper parts of which are fixed in a corresponding recess 109 cut in the lower face of the stocks 105 and 106.

Each of the stocks 105 and 106 carries a centre screw 110 which may be locked into position by a locking nut 111. A workpiece 27 is shown mounted for rotation between the centre-screws 110.

A limit switch 112 is mounted in the hollow body of the table 101 in a position near the pedestal 102.

Also arranged to be slid longitudinally along the table 101 are two adjustable diametral guide assemblies 120 and 121, each of which comprises a C-shaped yoke 122 having a forwardly extending foot 122a which is secured in the slot 103 by means of a clamping assembly 123 in a manner similar to that described for the stocks 105 and 106. Each of the yokes 122 carries an upper anvil 124 which is secured by a bolt 125 passing through a hole in the yoke 122 in known manner. Each of the yokes 122 also carries an anvil 126 clamped by clamping assemblies 127 at the level of the axis of rotation of the workpiece 27. Adjustable guide bars 128 are clamped to the feet 122a of the C-shaped yokes 122 by clamping assemblies 129 in a similar manner.

Two lugs 130 extend rearwardly behind the table 101 from points near each of the closed ends of the table 101. A stub shaft 131 has a portion of reduced diameter 132 which passes through an orifice in the lug 130 in which it is secured by a nut 133 threadedly received on a threaded end portion 134 of the portion 132. A swinging beam 135 which is shown in its raised position in FIGURES 2 and 3 and in its lower position in FIGURE 4 is mounted for rotation about the stub shafts 131 by means of extensions 136 each of which carries a ball race 137 cooperating with the stub shafts 131. The rear face of the beam 135 is grooved with a guide slot 138 having an internal enlargement therein for reception of a T-bolt 139 of a clamping assembly 140 which can be operated to clamp a bracket 141 at any desired position along the rear of the beam 135. The vertical alignment of the bracket 141 is assured by a bar 142 through which the shank 143 of the T-bolt 139 passes and which is housed partly in a recess in the bracket 141 and partly in a corresponding recess in the rear face of the beam 135. The bracket 141 has a rearward extension 144 which is vertically drilled to receive a pillar 145 for resiliently mounting a gauging unit 146 which is locked in the extension 144 by means of two set screws 147 and 148.

Slidably engaged on the pillar is shown near the bottom thereof a boss 150 which is clamped in position by a set screw 151; an upper boss 152 is shown positioned near the top of the pillar 145 and is similarly clamped. The boss 150 has secured to the front underside the rear portion of a cantilever leaf spring 153 and a similar leaf spring 154 is secured to the front top face of the boss 152.

A floating pillar 155 is positioned in front of the fixed pillar 145 and similarly carries bosses 156 and 157 at its lower and upper ends respectively each of these bosses being secured to the forward ends of the upper and lower leaf springs 153 and 154.

An intermediate boss 160 is clamped to the central portions of each of the pillars 145 and a second intermediate boss 161 is clamped to the pillar 155 by means of clamping screws 162. The screw 162 on the upper boss 160, clamped to the fixed pillar 145, carries the upper end of a tension springs 164, the lower end of which is secured to the screw 162 projecting from the lower boss 161 clamped on the floating pillar 155. The spring 164 urges the floating pillar 155 upwardly but its movement is arrested by the abutment of a cranked bracket 165 abutting against the stop screw 166 received in the end of a bracket 167 projecting from the boss 152 at the head of the fixed pillar 145.

A lower jaw 170 is axially located on the pillar 155 by a set screw (not shown) and has, at its outer end, an upwardly projecting sensing tip 171. An upper jaw bracket 172 is similarly mounted on an upper region of the pillar 155 and bears, as shown in detail in FIG. 5, at its outer end a cranked lever 173 carried for pivotal movement on the end of a leaf spring 174, one end of which is screwed to the bracket 172 and the other to the lever 173 which carries a downwardly projecting sensing tip 175 at its outer end and has a rear portion 176 extending rearwardly above the bracket 172. The rear portion 176 is urged upwardly by a coil spring 177 to bring the tip 175 into contact with the workpiece. A transducer 178 is mounted on a clamp 179 near the upper end of the pillar 155 having a probe 180 which bears on the end of the rear portion 176 on the cranked lever 173.

A similar gauging unit 181 is positioned near the other end of the table 101.

An actuator 182 for the limit switch 112 is secured beneath the swinging beam 135.

FIGURE 6 shows the left-hand template carrier support 22, the template carrier 17 and a reset mechanism 24, to be described later, in elevation from the rear. The template carrier support 22 comprises a bed 200 from which project upwardly two spaced template carrier support heads 201 and 202. Between the two support heads 201 and 202 there is a smaller upward projection 203 which is drilled and threaded to receive an adjustable heel-pin 204 having a hard upper pad 205 and which is locked in position by a lock nut 206. The template carrier 17 is extended horizontally outwards by a plate 207 which is secured underneath two counterweights 17a and 17b to project under the reset mechanism 24. The plate 207 carries near its outer end a stop-screw 208 which is locked by a nut 209.

In FIG. 7 may be seen a stub-shaft 210 projecting horizontally from the upper end of the support head 201 towards the other support head 202. The stub-shaft 210 has secured to it the inner ring 211 of the ball-race 212. The outer ring 213 of the ball-race is force-fitted into the wall of the template carrier casing 214. The support head 202 is equipped with a similar stub-shaft 210 and ball-race 212 so that the template carrier 17 is mounted to pivot about an axis defined by the aligned stub-shafts 210. The left-hand template carrier 17 carries a conventional tail-stock 215 which is shown in outline in FIGURE 7.

Reference is now made to FIGURE 14 which shows in more detail the mounting of the template carrier 20 in the template carrier support 23 in horizontal section together with the centre 21. The centre 21 comprises a casing 220 in the cylindrical bore of which a cylindrical ram 221 is slidably engaged. The ram 221 has an axial bore the intermediate portion 222 of which houses two bearings 223 and 225 and a spacer 224. Into a terminal enlarged portion 226 of the bore there is received one washer 227b of a thrust race 227 the other washer 227a of which is force-fitted around a collar 228a of a centre 228 and abutted by its shoulder 228b. The centre 228 has a rearward extension 229 passing through the thrust washer 227 to be supported by the two bearings 223 and 225, in which it is retained by a terminal washer 230 secured by a set screw 231.

The bore of the ram 221 has a portion of enlarged diameter 232 at the end opposite the centre 228. A compression spring 233 is received in this portion 232 of the bore, being retained at its inner end by a flanged washer 234, which abuts a shoulder 232a between the portions 222 and the portion 232 and at its other end is engaged by a ram nut 235 which itself is shown abutting a circlip 236 received in a recess close to the end of the ram 221. The ram nut 235 is threadably received on a ram screw 237. The ram nut 235 has engaged in its circumference a set screw 240 the outer end of which is arranged to slide in a slot 241 formed longitudinally in the portion 232 of the bore. The end of the casing 220 is closed by an end cap 243 secured by socket screws 244. A central aperture in the end cap 243 is provided with a bush 245 which serves to support the ram screw 237 for axial rotation by means of its shank 246. A knob 247 is fitted over the end of the shank 246 to which it is secured by a taper pin 248 passing through aligned transverse holes in the knob 247 and the shank 246. The movement of the ram screw 237 is prevented in one direction by the abutment of the knob 247 against the end cap 243, while movement of the ram screw 237 in the opposite direction is prevented by a collar 251, shown lying between the bush 245 and the ram nut 235.

It will be appreciated that movement of the centre 228 out of the casing 220 to engage an end of the template can be achieved by screwing the knob 247 in a sense to cause the ram nut 235 to move along the ram screw 237 and thus compress the compression spring 233. The spring 233 exerts a thrust through the washer 234 and thus, via the shoulder 232a, to the ram 221 which is caused to slide out of the casing 220 carrying with it the centre 228. The ram 221 is prevented from rotation by a set screw 252 engaging in a longitudinal groove 253 in the ram 221.

The double-acting hydraulic actuator 300 will now be described with reference to FIGURES 6 to 10 of the accompanying drawings, and with particular reference to FIGURE 9 which is a vertical section through the actuator 300. The actuator shown lies within a housing 301 which is mounted on the left-hand template carrier 17. The actuator 300 comprises, as may best be seen from FIGURE 8, a first hydraulic cylinder 302 in which a piston 303 is slidably engaged. In spaced end-to-end coaxial relationship with the first cylinder 302 there is arranged within the housing 301 a second hydraulic cylinder 302a in which is slidably engaged a piston 304. A toothed rack 305 has one end connected to the piston 303 and its other end connected to the piston 304. The first cylinder 302 is supplied with hydraulic fluid through a passage 306 drilled in a block 307 secured to the outside of the housing 301, the passage 306 being in communication with a banjo union 308 screwed into the block 307. The union 308 is connected by a pipe 309 (shown in FIGURE 6) to a second banjo union 310 screwed into a block 311 secured to the side of the housing 301 opposite the block 307. The union 310 communicates with the passage 312 in the block 311. Hydraulic fluid is supplied to the second cylinder 303 through another passage 313 drilled through the block 311. Each of the passages 312 and 313 is connected to a two-way hydraulic fluid control valve 314.

The rack 305 cooperates in the space between the cylinders 302 and 302a with a pinion 315 fixedly mounted on a vertical pinion shaft 316. As may be seen in FIG. 9 the pinion shaft 316 is provided above and below the pinion 315 with the screw threaded portion, the threaded portion 317a of greater diameter and pitch above the pinion 315 threadingly engaging a flanged nut 318 having a flanged body portion 318a and a depending annular internally threaded portion 318b. The body portion 318a is drilled to allow the passage of an unthreaded top portion of the pinion 316. The nut 318 is secured in the roof of the housing by set screws 319 passing through the flange of the portion 318a. The threaded portion 317b below the pinion 315 threadingly engages a nut 321 held against rotation by a resilient annular diaphragm 322. The diaphragm 322 is secured to the lower side of the nut 321 by a cap 323 having a dome 324 by means of set screws 325 passing through the inner periphery of the diaphragm 322. The diaphragm 322 is secured to the underside of the housing 321 by means of a clamping plate 326 having set screws 327 passing through its outer periphery. In FIGURE 9 the dome 324 is shown abutting the upper hardened pad 205 of the heel pin 204.

The threads provided on the upper nut 318 and the lower nut 321 are of different pitch to provide a differential displacement of the lower nut in relation to the housing 301, the flexible diaphragm 322 permitting limited vertical displacement of the nut 321.

The rack 305 is arranged to slide within a recess 328 in an insert 329 secured horizontally in the side of the housing 301. The rack is provided with an intermittent supply of oil from the pipe 330 via the banjo union 331, screwed into the insert 329, and the passage 332.

A vertical upward extension 340 of the pinion 316 carries two cams 341 and 342 each secured to the extension 340 by a set screw 343.

In FIGURE 6 part of a cover 344 the back part of which is secured to an upward vertical extension 336 of the housing 301 is shown broken away to reveal (with reference to FIGURE 6) a right-hand limit switch 346 and part of a left-hand limit switch 347. The left-hand limit switch 347 has a plunger 348 which cooperates with the upper cam 342 and similarly the limit switch 347 has a plunger 348 cooperating with the lower cam 341.

FIGURE 10 shows in end elevation the two-way hydraulic change-over valve 314 which is shown in rear elevation at the right-hand side of FIGURE 6 and in plan in FIGURE 7. A flow pipe 350 connected to a source of hydraulic fluid under pressure leads to the underside of the block 311 which acts as a sub-plate, (or manifold) for the valve 314 and is complemented by a return pipe 351 leading to a reservoir of hydraulic fluid. The centre portion or valve body 352 of the valve 314 is flanked by solenoids and is secured to the outer face of the block 311 to provide a direct connection with the cylinder 303a, the valve being operable to connect the cylinder alternatively either to the flow pipe 350 or return pipe 351. The connection from the valve 314 to the cylinder 302 is also made initially through the block via the passage 312 and thence through the union 310, the pipe 309, the union 308 and the passage 306. It will be apparent that when the cylinder 302 is connected to the flow pipe 350 the return pipe 351 is connected to the cylinder 302a and vice versa.

The reset mechanism 24 which is shown in elevation in FIG. 6 in relation to the template carrier 17 and the template carrier support 22, will now be described in detail with reference also to the sectional views of the reset mechanism in FIGS. 11 to 13. A reset transducer 400 is mounted on the carrier 17 in such a way as to prevent it from sustaining damage by maladjustment and to enable it to be reset to produce a signal representative of zero displacement. To this end the transducer 400 is arranged in a housing 401 for vertical displacement therein with a probe 402 of the transducer 400 projecting downwardly through an opening in the housing 401 for contact with a horizontal datum face of the plate 207 of the template carrier 17. The transducer 400 has a flexible connection 403 which is led through the top of the housing 401 and through a conduit 404.

The transducer 400 is mounted on a gauge carrier block 405 which is itself mounted between an upper horizontal cantilever leaf-spring 406 and a lower cantilever leaf-spring 407, the fixed ends of which are secured to the top and bottom faces of a support block 408 which is rigidly secured to the inner wall of the housing 401.

In cooperation with the carrier block 405 there is arranged a U-shaped member 409, the upper limb 410 of which extends transversely above the carrier block 405 and is provided with a downwardly extending upper anvil 411 adapted to bear on the upper surface of the carrier block 405 and the lower limb 412 of which extends transversely under the block 405 and is provided with a downwardly extending lower anvil 413 which passes through an opening in the housing 401 and is adapted to bear on the stop screw 208 on the extension 207 of the template carrier 17. The upper limb 410 of the U-shaped member 409 is suspended from an upper horizontal leaf-spring 414 which is secured to the upper face of a block 415 extending upwardly from the support block 408. Similarly the lower arm 412 of the U-shaped member 409 is carried on a lower leaf-spring 416 which is secured at its other end to the lower face of a block 417 extending downwardly from the block 408.

A vertically displaceable plunger 419 loaded by a compression spring 420 is engaged in a seating which is secured to the roof of the housing 401. The plunger 419 is arranged to bear down on the head of the anvil which in turn bears down on the upper face of the upper limb 410 of the U-shaped member 409, the effect of the arrangement being that the spring-loaded plunger 419 deflects the U-shaped member 409 downwardly and maintains the lower anvil 413 carried on the lower limb 412 in engagement with the stop screw 208. A further compression spring 422 is provided between the lower limb 412 of the U-shaped member 409 and the lower face of the carrier block 405 and has the effect of raising the block 405 and maintaining it in contact with the stop pin 411 depending on the lower face of the upper limb 410 of the U-shaped member 409.

The arrangement for clamping the carrier block 405 relative to the housing 401 will now be described with particular reference to FIGS. 11 and 12; a solenoid 425 is arranged above the roof of the housing 401 and an armature 426 extends downwardly to be connected to the upper part of a shank 427a of an actuating member 427, the shank 427a being arranged to reciprocate vertically within an aperture in the roof of the housing 401. The lower part of the actuating member 427 comprises two parallel plates 428 and 429 spaced from one another to accommodate therebetween the upper ends of each of two link arms 430 and 431, the link arms 430 and 431 being carried for pivotal movement by a pivot 424 passing between the two plate 428 and 429. The lower ends of each of the link arms 430 and 431 are pivotally connected each to a toggle arm 432 and 433 which are themselves pivotally mounted near their lower ends on pivots 434 and 435 respectively. The toggle arms 432 and 433 are normally urged inwardly towards one another by a tension spring 436 having one end connected to the toggle arm 432 at a point between the pivot 434 and the connection with the link arm 430 and the opposite end connected to a corresponding position on the toggle arm 433.

The toggle arm 432 is drilled and threaded near its lower end to receive a set screw 437 and the lower end of the toggle arm 433 is similarly provided with a screw 438. Access for adjustment of each of the screws 437 and 438 is provided through corresponding passages in the walls of the housing 401 which are closed by button headed screws 441 and 442.

Ligaments 443 and 444 extend horizontally outwards in a vertical plane from the sides of the support block 408 to a position between the carrier block 405 and the lower ends of each of toggle arms 432 and 433. Each of the ligaments 443 and 444 carries on its inner side facing the carrier block 405 clamping plates 445 and 446 respectively; the outer side of each of the ligaments 443 and 444 carries backing plates 447 and 448 respectively, whose outer faces are each adapted to cooperate with the set screws 437 and 438. The ligaments 443 and 444 are set to bias the clamping plates 445 and 446 away from the block 405.

The operation of the error correction device may be conveniently followed in outline from the block diagram of FIG. 15. In operation the workpiece 27 is brought to the required profile and size automatically under the control of the tracer following the template 19 and when the workpiece 27 has been completed any errors resulting from tool wear or temperature variation are then corrected for by automatic operation of the error correction device hereinbefore described.

To set the device a correctly dimensioned master workpiece 27 is transferred to the workpiece gauging station 26 and mounted between the centre screws 110 in the condition where the swingable beam 135 carrying the gauging units 146 and 181 is swung down to the loading position shown in FIG. 4. The anvils 124, 126 and 128 on each of the adjustable diametral guide assemblies 120 and 121 are then adjusted to the approximate dimensions of the workpiece 27 allowing adequate clearance to enable the master workpiece to be removed when the centre screws 110 on each of the stocks 105 and 106 are withdrawn. Subsequently workpieces may be easily inserted into the gauging station 26 without the use of the screws 110 adequate location being provided by the guide assemblies 120 and 121.

The lower jaw 170 and the bracket 172 on each of these gauging units 146 and 181 are also adjusted to the approximate dimension of the workpiece 27 and the swingable bed 135 is then swung up to the gauging position shown in FIG. 3. With a diameter of the workpiece lying between the sensing tips 171 and 175 of the gauging unit 146 the transducer 178 is adjusted to a zero position. Simultaneously the rack 305 of the tempate carrier 20 is adjusted to bring the pinion shaft 316 to a position to place the template carrier 20 in the centre of its stroke, the correct position being detected by the limit switches 346 and 347. Similarly, the transducer 178 on the gauging unit 181 is set to zero and the template carrier 17 is set to the centre of its stroke. The device is now ready to correct errors automatically in a workpiece subsequently produced by the lathe 11. A workpiece 27 is loaded in the gauging station 26 in the manner already described. On depression of an initiating control button the swingable beam 135 takes up the measuring position to operate the limit switch 112 by the actuator 182. Operation of the limit switch 112 energises the transducers 178 and also the solenoids 425 of the reset mechanisms 24 and 25 in a manner now to be described with reference to the mechanism 24.

The energisation of the solenoid 425 consequent upon the closing limit switch 112 causes a downward displacement of the armature 426 and a corresponding downward movement of the actuating member 427. The resultant movement transmitted to the link arms 430 and 431 causes the outward displacement of the upper parts of each of the toggle arms 432 and 433 against the action of the tension spring 436. The inward movement imparted to the lower parts of each of the pivoted toggle arms 432 and 433 is transmitted through the inner ends of each of the set screws 437 and 438 to the backing plates 447 and 448 causing each of the associated clamping pads 445 and 446 to move inwardly, tightly to grip the carrier block 405.

The two transducers 178 on the gauging units 146 and 181 generate error signals which are a measure of the extent to which the workpiece 27 deviates from the required dimension at each end. The output error signal from the transducer 178 on the gauging unit 146 is applied to its associated difference unit 30 and the error signal from the other gauging unit 181 to the unit 31. The difference units 30 and 31 are each adapted to produce a difference signal which is a measure of the difference between the error signal applied to it and a signal from the respective reset transducer 400 in a manner to be described.

If, for example, the signal from the difference unit 30 implies that the gauged dimension of the workpiece 27 is oversize the left-hand of template 19 will have to be lowered by half that amount in order to effect a correction. As the template carrier 17 is pivotally mounted the side bearing the actuator 300 must be raised relative to the template carrier support 22. To this end the hydraulic valve 314 is operated to supply hydraulic fluid to the cylinder 302 from the flow pipe 350 thus causing movement of the piston 303, the rack 305 and of the other piston 304 to expel fluid through the return pipe 351. The subsequent rotation of the pinion 315 together with the pinion shaft 316 causes the shaft 316 to be screwed up into the other fixed nut 318 and out of the lower nut 321 which is lowered relative to the template carrier 17, thus causing the carrier 17 to be pivoted by the action of the dome 324 of the nut 321 against the upper hardened pad 205 of the heel pin 204.

The raising of one side of the template carrier 17 relative to the template carrier support 22 is detected by the movement of the transducer probe 402 which remains biased in contact with the plate 207 of the template carrier 17. The transducer 400 produces an output signal representing a displacement of the template carrier 17 from the initial zero position. When the signal from the transducer 400 becomes equal to the signal from the transducer 178 on the corresponding gauging unit 181 the signal from the difference unit 30 becomes zero and the hydraulic feed of the double acting hydraulic actuator 300 and differential screw is cut off, bringing the template carrier 17 to rest.

The other end of the template 19 is similarly adjusted by raising or lowering of the other template carrier 20 under the control of the signal from the other difference unit 31.

It will be appreciated that with the new setting of the template carrier 17 the reset transducer 400 will be producing an output signal representative of the displacement of the template carrier 17 from the original zero position and that it is necessary then to reset the transducer 400 to a position which will give a zero output signal and this is accomplished by releasing the clamping mechanism on the carrier block 405. De-energisation of the solenoid 425 after lowering of the swingable bed 135 and consequent opening of the limit switch 112 causes the upward movement of the armature 426 allowing the tension spring to operate to move the lower ends of the toggle arms 432 and 436 away outwardly from the carrier block 305, thus permitting the clamping plate 445 and 446 to move outwardly under the bias of the ligaments 433 and 434 on which the plates are mounted.

As the previously described movement of the plate 207 has been upward relative to the housing 401 the U-shaped member 409 will have been carried upwardly relative to the clamped block 405 depressing the plunger 419 to compress the spring 420 and also compressing the spring 422. When the block 405 is released the compression spring 422 will serve to urge the block 405 upwardly so that its upper face is again brought into contact with the upper anvil 411. The action of the spring 420 retains the lower anvil 413 against the plate 207; in this position the transducer 400 will again measure zero displacement relative to the datum face of the plate 207.

Conversely when the movement of the plate 207 is downward towards the template carrier support the anvil 413 and the U-shaped member 409 on which it is mounted will remain stationary relative to the clamped carrier block 405. When the movement of the template carrier 17 has stopped and the carrier block 405 is unclamped in the manner already described the action of the spring 420 will be to move the U-shaped member 409 and the carrier block 405 downwardly until the lower anvil 413 is again in contact with the datum face of the plate 207. In this position the transducer 400 will again be set to measure zero displacement with the lowermost part of its probe 402 resting against the plate 207 in the same plane as the tip of the lower anvil 413. It will be appreciated that in this position the two spring mounted members namely the block 405 with the associated transducer 400 and the U-shaped member 409 will be displaced relative to the housing 401 from the position which they occupied prior to the operation of the reset mechanism and the clamping and unclamping of the carrier block 405.

What we claim as our invention and desire to secure by Letters Patent is:

1. An error correction device for a profiling lathe of the kind specified, the device comprising a guaging unit mounted on or near to the lathe for gauging a workpiece and for generating an error signal representing the difference between the gauged dimension of the workpiece and the required dimension, a template displacement measuring device for generating a template displacement signal representing the displacement of the template from a preset datum position, a difference unit for generating a difference signal representative of the difference between the error signal and the template displacement signal and correcting means responsive to said difference signal for so moving the template as to reduce said difference signal.

2. An error correction device according to claim 1, wherein the template displacement measuring device is mounted on a reset mechanism to set the device to the datum position representing the existing position of the template, the reset mechanism comprising a resilient mounting for permitting reciprocal motion of the measuring device in the direction of displacement of the template, a repositioning device resiliently mounted for movement in said direction independently of the measuring device and biased by first resilient means urging it toward the datum position and having a stop portion or stop means against which the template measuring device is resiliently urged by second resilient means in a direction away from the datum position, and securing means for securing the measuring device against displacement on its resilient mounting during measurement of the template displacement.

3. A device according to claim 1 wherein the template is mounted in a template carrier which is pivotably mounted in a template carrier support to permit displacement of the template.

4. A device according to claim 1 wherein the correcting means comprises a rack and a pinion drivingly engaging the rack and mounted on a shaft having one end threadingly engaging a non-rotational nut, the arrangement being such that relative movement between the shaft and the nut causes displacement of the template.

5. A device according to claim 4 wherein the nut is fixed in relation to the template carrier support, the other end of the shaft acts against the template carrier, and the axial movement of the shaft is utilised to impart pivotal movement to the template carrier.

6. A device according to claim 5, wherein said other end of the shaft is threadingly engaged in a further nut having a thread of different pitch from that of the first-mentioned nut, which further nut is held against rotation but is permitted limited axial movement, the rotation of the pinion shaft causing a differential displacement of the further nut relative to the said first mentioned nut to impart or permit movement of the template carrier.

7. A device according to claim 6, wherein the said further nut is secured to the central portion of a flexible diaphragm mounted on the template carrier support.

8. A device according to any of claim 4 additionally comprising hydraulic means for imparting longitudinal displacement to the rack.

9. A device according to claim 8 wherein the rack has an end connected to a piston of a first hydraulic cylinder and its other end connected to a piston of a second cylinder, the cylinders being arranged in spaced end-to-end coaxial relationship.

10. A device according to claim 9 wherein the displacement of the rack is limited in each direction by a limit switch operative to cut off supply of fluid to one of the hydraulic cylinders.

11. A device according to claim 10 wherein each of the limit switches is operated by a cam mounted on the pinion shaft.

12. A device according to claim 1 wherein the gauging unit comprises a fixed jaw, the gauged dimension of the workpiece being its diameter extending from the point of contact of the workpiece with the jaw.

13. A device according to claim 12 comprising a pivoted member one end of which is in contact with the workpiece at a point diametrically opposite the point of contact of the fixed jaw and the other end of which is in contact with a measuring element.

14. A device according to claim 12 wherein the gauging unit is mounted on two spaced cantilever leaf springs to allow movement in the direction of the gauged dimension of the workpiece.

15. A device according to claim 12 wherein the gauging unit is mounted on a bed which is movable relative to the workpiece between the loading position and the gauging position.

16. A device according to claim 12 wherein the gauging unit is adapted to gauge a rotating workpiece.

17. A device according to claim 3 wherein the datum position is set relative to the template carrier.

18. A device according to claim 3 wherein the reset mechanism is mounted on the template carrier support.

19. A device according to claim 2, wherein the resilient mounting comprises a pair of horizontally spaced cantilever leaf springs.

20. A device according to claim 2 wherein said repositioning device is resiliently mounted on cantilever leaf springs.

21. A device according to claim 2 wherein the second resilient means acts between the said resilient mounting and the repositioning member.

22. A profiling lathe comprising an error correction device according to claim 1 for correcting errors at one end of the workpiece and a further correction device according to any of the preceding claims for correcting errors at the other end of the workpiece.

23. A lathe according to claim 22 wherein the workpiece is mounted for rotation between the two template carriers.

References Cited

UNITED STATES PATENTS

| 2,937,325 | 5/1960 | Garber | 90—13 |
| 3,020,791 | 2/1962 | Le Brusque | 82—14 |

FOREIGN PATENTS 802,206  10/1958  Great Britain.

GERALD A. DOST, *Primary Examiner.*

U.S. Cl. X.R.

51—100